United States Patent [19]

Watanabe

[11] Patent Number: 5,103,305
[45] Date of Patent: Apr. 7, 1992

[54] MOVING OBJECT DETECTING SYSTEM

[75] Inventor: Mutsumi Watanabe, Tokyo, Japan

[73] Assignee: Kabushiki Kaisha Toshiba, Kawasaki, Japan

[21] Appl. No.: 589,782

[22] Filed: Sep. 26, 1990

[30] Foreign Application Priority Data

Sep. 27, 1989 [JP] Japan .................................. 1-249071

[51] Int. Cl.$^5$ ............................................. H04N 7/18
[52] U.S. Cl. ................... 358/105; 358/108; 358/136; 901/47
[58] Field of Search ............... 358/105, 136, 108, 125, 358/103; 901/47, 46

[56] References Cited

U.S. PATENT DOCUMENTS 4,628,453 12/1986 Kamejima et al. ................... 358/103
4,951,140 8/1990 Ueno et al. ............................ 358/105

OTHER PUBLICATIONS

IEEE PAMI, vol. PAMI-7, No. 4, pp. 384–401, entitled: "Determining Three-Dimensional Motion and Structure from Optical Flow Generated by Several Moving Objects", G. Adiv, 1985.

Primary Examiner—James J. Groody
Assistant Examiner—Glenton B. Burgess
Attorney, Agent, or Firm—Oblon, Spivak, McClelland, Maier & Neustadt

[57] ABSTRACT

A moving object detecting system includes an image acquiring section, a feature extracting section, a background detecting section, a prediction parameter calculating section, a region estimating section, and a moving object determining section. The image acquiring section has a mobile imaging system and acquires image frames sequentially obtained upon movement of the imaging system. The feature extracting section extracts features of the acquired image frames. The background feature detecting section detects a background feature from the features. The prediction parameter calculating section obtains prediction parameters for predicting a motion of the background region upon movement of the imaging system in accordance with a positional relationship between the correlated background features. The region estimating section estimates a region where features detected from image frames obtained by the mobile imaging system may have been present in an image frame of the immediately preceding frame by using the prediction parameters. The moving object determining section determines whether a feature corresponding to the given feature is present in the estimation region, thereby checking the presence/absence of the moving object.

14 Claims, 3 Drawing Sheets

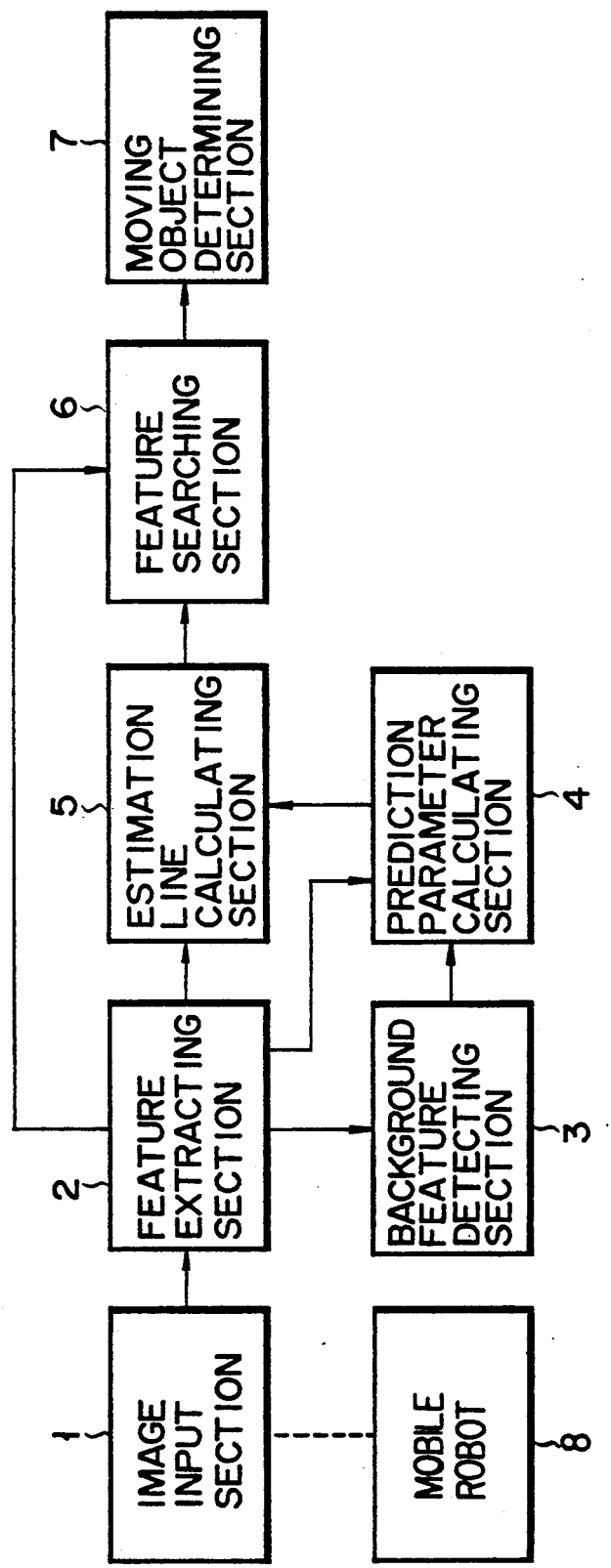
F I G. 1

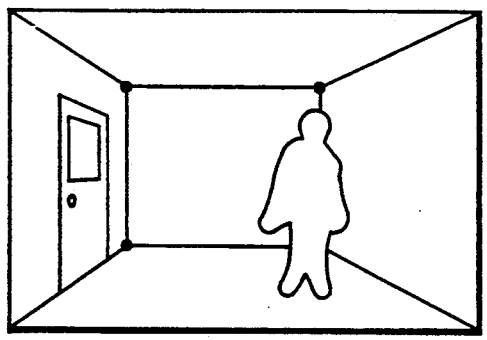
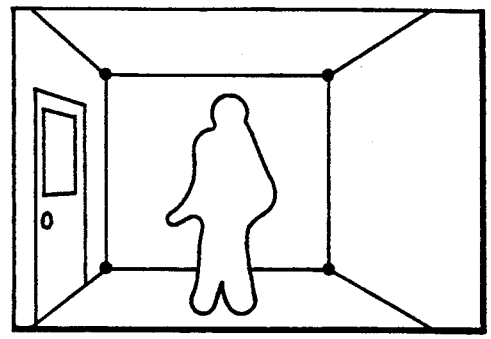
F I G. 3A      F I G. 3B
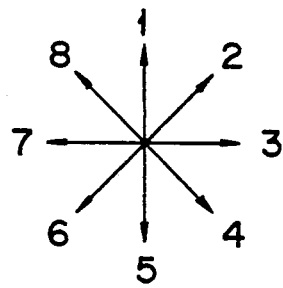
F I G. 4
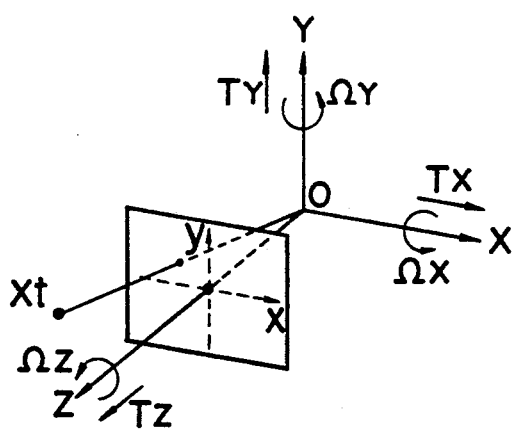
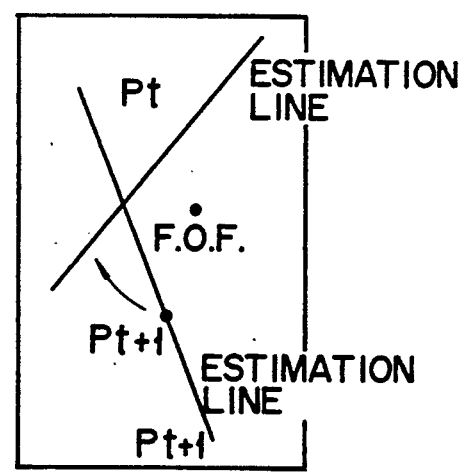
F I G. 5      F I G. 6

MOVING OBJECT DETECTING SYSTEM

BACKGROUND OF THE INVENTION

1. Field of the Invention

The present invention relates to a moving object detecting system for effectively detecting a moving object in a given environment from environmental image frames momently obtained by a mobile imaging system incorporated in a moving unit such as a mobile robot.

2. Description of the Related Art

One of the important techniques for realizing a state monitor apparatus, a mobile robot, or the like is a technique for detecting a moving object in a given environment from environmental image frames from moment to moment obtained by an imaging system which is movable. This technique for detecting the moving object from a moving image is based on a so-called motion analysis. In recent years, extensive studies have been made on this detection technique in the field of computer vision. This technique, however, is not applied to practical apparatuses or field works.

Image processing for detecting such a moving object is called a gradient-based scheme for generally detecting spatial and temporal changes in image densities of moving image frames as an object of interest. In addition to this scheme, a feature-based scheme is available in which features such as edges of a moving image (i.e., an object of interest) are extracted, and these features are correlated to each other between image frames having a time difference, thereby estimating a displacement and hence detecting the moving object.

Although the former scheme, i.e., the gradientbased scheme has an advantage in that a fine displacement can be attained with respect to the entire image, since spatial and temporal changes in image densities are detected by differentiations, detection precision is greatly degraded in the presence of noise in the image. In addition, in principle, accurate estimation values cannot be obtained in a region having a small change in density or a boundary region of the object.

To the contrary, in the latter scheme, i.e., the feature-based scheme, although portions of interest subjected to displacement measurements are dispersed in a distribution since features in an image are used, a problem such as degradation of detection precision caused by noise can be greatly reduced. In the feature-based scheme, it is not easy to correlate the features to each other between image frames having a time difference. This correspondence processing requires a long period of time if it is accurately performed in accordance with its theory. For this reason, the moving object in an environment monitored by a moving image cannot be detected at high speed.

In the conventional image processing techniques, the moving object in its environment cannot be accurately detected at high speed from image frames momently detected by a mobile imaging system.

SUMMARY OF THE INVENTION

It is an object of the present invention to provide a moving object detecting system which can easily, precisely, quickly detect a moving object in an environment from environmental image frames momently obtained by a mobile imaging system.

The moving object detecting system according to the present invention has a feature extracting section for sequentially extracting features from image frames momently and sequentially imaged by a mobile imaging system. The moving object detecting system detects background features included in a background region of the image frames from the features extracted by the feature extracting section. For example, parameters for predicting a motion of the background region in the image upon movement of the imaging system are obtained from a positional relationship between the corresponding background features between a plurality of image frames in, e.g, an initial period of movement. The moving object detecting system estimates a region where features detected from image frames obtained by the mobile imaging system may have been present at immediately preceding moments (if a given feature belongs to the background) on the basis of the prediction parameters and detects whether a feature corresponding to the given feature belongs to the estimated region of presence, thereby detecting the presence/absence of the moving object.

In the system of the present invention, the features apparently belonging to the background are correlated to each other from an image obtained in the initial period of movement, and the prediction parameters are obtained from this positional relationship. The system then determines whether the corresponding feature is present within the estimated region based on the prediction parameters and whether the feature belongs to the background, thereby detecting the moving object in the image.

In the moving object detecting system according to the present invention, the prediction parameters are estimated from motion of the known background at the start of movement of the mobile imaging system. On the basis of the prediction parameters, those positions in the immediately preceding frame which correspond to the respective features obtained from the moving image frame are estimated, and only those features which do not have corresponding features at the estimated positions in the immediately preceding frame are extracted. Therefore, the moving object in the moving image can be efficiently, accurately searched at high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram illustrating an arrangement of a moving object detecting system according to the first embodiment of the present invention;

FIGS. 3A and 3B are views illustrating input image frames which have changes in backgrounds upon movement of an imaging system and which are used to explain the system shown in FIG. 2;

FIG. 4 is a view showing directions of spatial differentiations of input image frames so as to explain the system shown in FIG. 2;

FIG. 5 is a view for explaining a coordinate system which is used to explain the system of FIG. 2 and which is associated with a motion of a camera serving as an imaging system; and FIG. 6 is a view showing estimation lines for features used for explaining the apparatus of FIG. 2.

DETAILED DESCRIPTION OF THE PREFERRED EMBODIMENT

Figure 2:
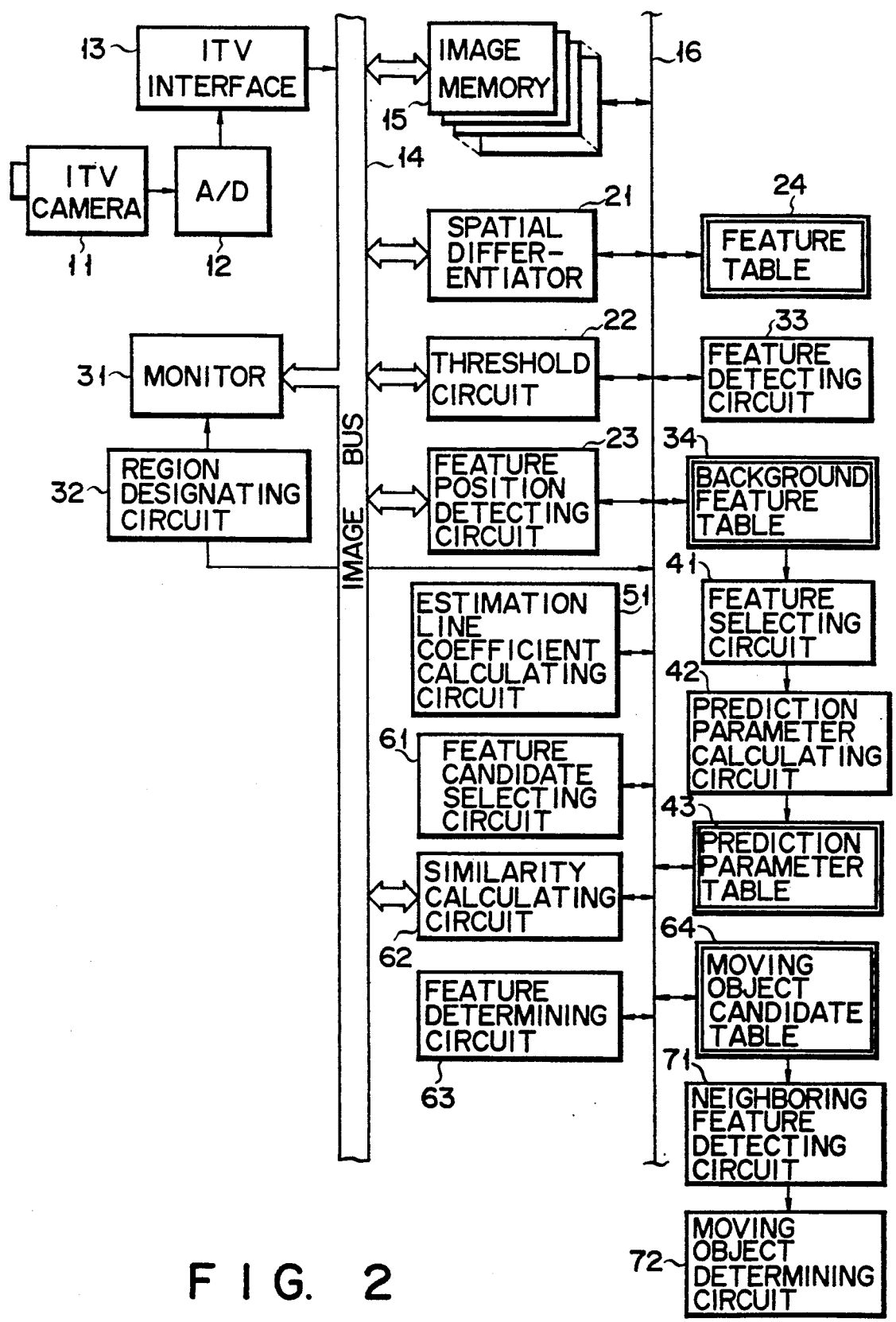
FIG. 2 is a block diagram illustrating an arrangement of a moving object detecting system according to the second embodiment of the present invention.

A moving object detecting system according to the first embodiment of the present invention will be described with reference to the accompanying drawings.

The moving object detecting system shown in FIG. 1 comprises an image input section 1, a feature detecting section 2, a background feature detecting section 3, a prediction parameter calculating section 4, an estimation line calculating section 5, a feature searching section 6, and a moving object determining section 7.

The image input section 1 comprises an imaging system mounted on a moving system such as a mobile robot 8 and momently image frames and inputs moving environmental image frames to the system. Upon movement of the moving system, frames of image information sequentially imaged and input from the image input section whose imaging position is sequentially changed are supplied to the feature extracting section 2. The feature extracting section 2 sequentially extracts regions having large spatial differential values a features.

The background feature detecting section 3 detects background features of a plurality of image frames which are input by the image input section 1 in an initial period of movement, from pieces of feature information respectively extracted from the plurality of image frames. The background features are correlated to each other between the plurality of image frames. That is, the background feature detecting section 3 processes input image frames in the initial period of movement as initial image frames serving as criteria of subsequent image processing and designates its background region to correlate features to each other between the plurality of image frames in this background region. The prediction parameter calculating section 4 calculates parameters for predicting a motion of the background region moving in the input image frames upon movement of the image input section 1. These parameters are 15 parameters representing changes in the imaging system (to be described in detail later in association with the second embodiment).

As for the features detected in units of input image frames by the feature extracting section 2 on the basis of input image frames momently and sequentially input by the image input section 1, the estimation line calculating section 5 estimates (reverse-predicts) a region of presence of the given feature obtained at an immediately preceding timing to be a line region (to be described later) on the basis of the parameters obtained by the prediction parameter calculating section 4 and the positions of the features in the input image frames. This region of presence of the feature is performed in units of features extracted from the input image frames.

The feature searching section 6 checks whether a corresponding feature is present in an estimated region of presence of each feature of the immediately preceding timing obtained by the estimation line calculating section 5. If the corresponding feature is not detected from the image of the previous frame, the feature information is output to the moving object determining section 7. Pieces of feature information having no correspondence with features in the image of the previous frame are acquired by the moving object determining section 7. The moving object determining section 7 checks the number of features and their positional proximities. The feature count and proximity data are detected as moving object information in the corresponding input image.

In the moving object detecting system having the above arrangement, the following series of operations are basically performed.

(a) Regions where features extracted from sequentially input image frames may have been present in image frames obtained at the immediately preceding timings are estimated (if the features belong to the background).

(b) When features corresponding the estimated regions are not found, the extracted features are detected as new features of the image frames.

(c) Information of the new features is processed to detect information of a moving object appearing in an image.

Since the estimated regions of the features of the image frames obtained at the immediately preceding timings are obtained as line regions from the prediction parameters representing the background motion obtained in accordance with a relationship between background features correlated to each other from the image frames obtained at, e.g., the initial period of movement, the correlation processing (i.e., processing for determining whether the features are present in the estimated regions) can be effectively, easily performed. The processing speed of determination processing can be sufficiently increased.

For this reason, the moving object appearing in image frames sequentially obtained by the mobile imaging system can be accurately detected at high speed.

The moving object detecting system according to the present invention may be arranged as a system corresponding to the sections shown in FIG. 1 or a combination of circuit blocks. However, the second embodiment exemplifies a practical system having substantially the same function as described above.

FIG. 2 shows an arrangement of a moving object detecting system according to the second embodiment.

Referring to FIG. 2, a portion corresponding to the image input section 1 shown in FIG. 1 comprises an ITV (industrial television) camera 11, an A/D (analog-to-digital) converter 12, and an ITV interface 13.

The ITV camera 11 is mounted on the moving body and is used to sequentially image and input environmental image frames obtained upon movement of the moving body. The A/D converter 12 converts the image signal obtained by the ITV camera 11 into digital data. The ITV interface 13 is an interface for sequentially storing the converted digital image data into an image memory 15 through an image bus 14.

The image memory 15 has a memory capacity capable of storing a plurality of image frames. The read/write access of the image memory 15 is properly controlled in response to a control signal supplied through a control bus 16 connected to the image memory 15.

In the moving environmental image frames sequentially imaged by the ITV camera 11, as shown in FIGS.

3A and 3B, stationary backgrounds are changed in the obtained image frames in their imaging environments upon changes in imaging position upon movement of the ITV camera 11. The moving object detecting system is used to efficiently detect a moving object (an image component except for the background) from environmental image frames accompanying displacements of image information in the background.

A portion corresponding to the feature detecting section 2 for detecting features from image frames sequentially obtained by and input from the ITV camera 11 in the image input section comprises a spatial differentiator 21, a threshold circuit 22, and a feature position detecting circuit 23, all of which are connected to the image memory 15 through the image bus 14. This portion also comprises a feature table memory 24 connected to the above constituent circuits through the control bus 16.

The spatial differentiator 21 calculates difference values for a local region of an image stored in the image memory in radial directions (eight directions) along predetermined fourth axes at equal angular intervals, as shown in FIG. 4, thereby performing spatial differentiation. The threshold circuit 22 compares a threshold value with the difference values of the respective directions calculated by the spatial differentiator 21, thereby detecting features.

More specifically, when a difference value of each direction in a portion of an image exceeds a predetermined threshold value, this portion is detected as a feature image portion having a large spatial differential value. Feature detection information is supplied to the feature position detecting circuit 23, and the position of the feature on the image is calculated. Pieces of feature detection position information are sequentially stored as a feature table in the feature table memory 24.

This feature detection processing is performed in units of image frames sequentially obtained and stored in the image memory 15. Pieces of feature detection position information obtained from each image are classified, and the classified pieces of information are written in the feature table.

A portion corresponding to the background feature detecting section 3 comprises an image monitor 31, a region designating circuit 32, a feature detecting circuit 33, and a background feature table memory 34.

The image monitor 31 is connected to the image bus 14 to monitor an image stored in the image memory 15. The region designating circuit 32 causes the image monitor 31 to sequentially display image frames sequentially obtained and input by the ITV camera 11 in the image input section at, e.g., the start of movement. The image monitor 31 designates a stationary background in the image environment as, e.g., a rectangular region upon operator's operation with respect to these displayed environmental image frames at the start of movement. More specifically, the operator uses the region designating circuit 32 to designate a known background (a stationary image portion with respect to the environment) from the environmental image obtained upon the start of movement. The background image is set in the environmental image. The background is interactively designated by properly changing the positions, sizes and number of rectangular regions.

Of a plurality of features stored as a feature table in the feature table memory 24, the feature detecting circuit 33 selectively extracts features belonging to the designated background region. Pieces of feature information thus obtained are stored in the background feature table memory 34 as background feature table information serving as the basis of feature correlation processing.

This background feature detection processing is similarly performed for the next frame image obtained upon the start of movement, and the obtained information is stored in the background feature table memory 34.

A portion corresponding to the prediction parameter calculating section 4 comprises a feature selecting circuit 41, a prediction parameter calculating circuit 42, and a prediction parameter table memory 43.

The feature selecting circuit 41 correlates the background features in an image frame obtained at the start of movement and stored in the background feature table in the background feature table memory 34 and the background features in an image frame obtained upon the start of movement under the assumption that a large change does not occur between these image frames. It is also possible to interactively correlate the background features by using the image monitor 31 and the region designating circuit 32. The prediction parameter calculating circuit 42 calculates parameters representing a displacement of the background on the image in accordance with the displacement of the moving system, i.e., displacement of the imaging system (the ITV camera 11 in the image input section) which causes displacements of features in accordance with a positional relationship between the correlated background features between the two image frames obtained at the time of movement and upon the start of movement. The obtained parameters are written in a prediction parameter table stored in the prediction parameter table memory 43.

The parameters representing the movement of the background are defined as follows when a coordinate system associated with the position of the imaging system (ITV camera 11) is defined, e.g., as shown in FIG. 5:

That is, a translational component of a motion of the imaging system is given as:

$$(-T_X, -T_Y, -T_Z)$$

and its rotational component is given as:

$$(-\Omega_X, -\Omega_Y, -\Omega_Z)$$

Then, the motion of a stationary object (i.e., the background) in the environment with respect to the camera coordinate system is given as follows when its rotational component is given to be sufficiently small:

$$X_{t+1}(X_{t+1}, Y_{t+a}) = R \cdot X_x(X_t, Y_t, Z_t) + T \tag{1}$$

where $$R = \begin{bmatrix} 1 & -\Omega_Y & \Omega_Z \\ \Omega_Z & 1 & -\Omega_X \\ -\Omega_Y & \Omega_X & 1 \end{bmatrix}$$

$$T = (T_X, T_Y, T_Z)$$

A projection position $(x_t, y_t)$ on the $X_t$ image, i.e., the coordinates are given as follows:

$$x_t = X_t/Z_t, \quad Y_t = Y_t/Z_t \tag{2}$$

Assuming that:

$$T_X/Z_t = \bar{T}_X$$

$$T_Y/Z_t = \bar{T}_Y$$

$$T_Z/z_t = \bar{T}_Z$$

the following equations are derived from equations (1) and (2):

$$X_{t+1} = \frac{x_t - \Omega_Z y_t + \Omega_Y + \bar{T}_X}{1 - \Omega_Y x_t + \Omega_X y_t + \bar{T}_Z}$$

$$X_{t+1} = \frac{Y_t - \Omega_X y_t + \Omega_X + \bar{T}_Y}{1 - \Omega_Y x_t + \Omega_X y_t + \bar{T}_Z}$$

When the above equations are solved with respect to the point $(x_t, Y_t)$, the following positional relationship can be obtained:

$$x_t = \phi(x_{t+1}, Y_{t+1}) + (1/Z_t)\Phi(x_{t+a}, Y_{t+a})$$

$$Y_t = \psi(x_{t+a}, Y_{t+1}) + (1/X_t)\Psi(x_{t+a}, Y_{t+a})$$

(3)

where $$\phi = \frac{Dx_{t+1} + Ey_{t+1} + F}{Ax_{t+1} + By_{t+1} + C}$$

$$\Phi = \frac{Gx_{t+1} + Hy_{t+1} + I}{Ax_{t+1} + By_{t+1} + C}$$

$$\psi = \frac{Jx_{t+1} + Ky_{t+1} + L}{Ax_{t+1} + By_{t+1} + C}$$

$$\Psi = \frac{Mx_{t+1} + Ny_{t+1} + O}{Ax_{t+1} + By_{t+1} + C}$$

The fifteen parameters A to O have the following meanings:

$$A = \Omega_Y + \Omega_X \Omega_Z$$

$$B = -\Omega_X + \Omega_Y \Omega_Z$$

$$C = 1 + \Omega_Z^2$$

$$D = 1 + \Omega_X^2$$

$$E = \Omega_Z + \Omega_X \Omega_Y$$

$$F = -\Omega_Z + \Omega_X \Omega_Z$$

$$G = -\Omega_Z + \Omega_X \Omega_Y$$

$$H = 1 + \Omega_Y^2$$

$$I = \Omega_X + \Omega_Y \Omega_Z$$

$$J = \Omega_X T_X + \Omega_Z T_Z$$

$$K = \Omega_X T_X + \Omega_Z T_Z$$

$$L = -(T_X - \Omega_Z T_Y)$$

$$M = -(\Omega_Y T_Y + \Omega_Z T_Z)$$

$$N = T_Z + \Omega_Y T_X$$

$$O = -T_Y + \Omega_Z T_X$$

The fifteen parameters A to 0 are defined as prediction parameters representing features between image frames obtained by the mobile imaging system. When these parameters are obtained by the prediction parameter calculating circuit 42, displacements of features extracted from image frames between a plurality of image frames can be predicted.

More specifically, for example, the fifteen prediction parameters A to 0 correlate the background features of two image frames (at least eight features of each image) at the time of movement and upon the start of movement of the imaging system under the assumption that a Z initial value (i.e., a distance between the background and the imaging system prior to movement) is known. These pieces of position information are substituted to obtain the correlated background features.

When Zt is eliminated from equations (3), the following equation is obtained:

$$\Phi(x_{t+1}, Y_{t+1})Y_t - \Psi(x_{t+1}, Y_{t+1})x_t + \Psi(x_{t+a}, Y_{t+1})\phi(x_{t+1}, Y_{t+1}) - \Phi(x_{t+1}, Y_{t+1})\Phi(x_{t+1}, Y_{t+1}) = 0 \quad (4)$$

This equation represents a line.

Equation (4) representing the line indicates that a point $P_t(x_t, Y_t)$ in the immediately preceding frame is present in the region (estimated line) represented by equation (4) if the feature $P_{t+1}(x_{t+1}, y_{t+1})$ in the image belongs to a stationary object with respect to the environment. When the feature is found in the image, the line represented by equation (4) in the immediately preceding frame is searched to determine whether the corresponding feature is present, thereby determining whether the feature belongs to the stationary object with respect to the environment. That is, when the corresponding feature is present on the line represented by equation (4), the feature of interest belongs to the stationary background object with respect to the environment. However, when the feature corresponding to the feature of interest is not present, the feature of interest belongs to a new object which is not the background.

The estimation line coefficient calculating circuit 51 constituting a portion corresponding to the estimation line calculating portion 5 obtains position information of the feature extracted from the moving image frame in accordance with the feature table in the feature table memory 24 and calculates the coefficients $\phi$, $\psi$, $\Phi$, and $\Psi$ in accordance with the 15 prediction parameters stored in the prediction parameter table memory 43, thereby obtaining an estimation line representing the region in which each feature belongs.

A portion corresponding to the feature searching section 6 comprises a feature candidate selecting circuit 61, a similarity calculating circuit 62, a feature determining circuit 63, and a moving object candidate table 64.

As for a plurality of features extracted from the moving image frame, the feature candidate selecting circuit 61 extracts as feature candidates features of the immediately preceding frame which are stored in the feature table memory 24 and are present on the estimation line. That is, an estimation line (i.e., an estimation region) in which correlated features of the immediately preceding frame are present is obtained for the features extracted from the moving image frame, as shown in FIG. 6, and it is determined whether the features are present on this estimation line. All features present on the estimation line are obtained as features which can be correlated to the features of the current frame.

The similarity calculating circuit 62 calculates a similarity between a feature of the image and its neighboring partial image region in the immediately preceding frame and a feature and its neighboring partial image region in the current frame. This similarity is obtained as follows:

$$\Sigma(L_{ij}-R_{ij})^2/(\Sigma L_{ij} \Sigma R_{ij})$$

where $L_{ij}$ and $R_{ij}$ are image densities of the correlated features and neighboring regions between the image of the current frame and the image of the immediately preceding frame.

The feature determining circuit 63 compares the obtained similarity with a predetermined threshold value and determines whether the image features are sufficiently similar to each other. That is, the correlated features are defined as similar image features from all the features of the image of the immediately preceding frame. Feature for which correlated features cannot be detected in the immediately preceding frame by this determination processing are determined to be new features. The information of such new features is stored as a moving body candidate table in the moving body candidate table 64.

A portion corresponding to the moving body determining section 7 comprises a neighboring feature detecting circuit 71 and a moving object determining circuit 72.

The neighboring feature detecting circuit 71 extracts features, the distance values of which are smaller than a predetermined threshold value, from the features stored in the moving object candidate table 64. The moving object determining circuit 72 determines the number of features and a ratio of the area of the features to the area of the entire image and detects that features which are determined not to belong to the background belong to a moving object entering the environment.

As described above, in the moving object detecting system of the present invention, regularity of motion of the background upon movement of the imaging system is taken into consideration. The region of movement of features upon movement of the imaging system is estimated to obtain feature correlation between a plurality of image frames. In addition, the region of movement of the features is estimated as a line region in accordance with the prediction parameters determined on the basis of the motion data of the background in the initial image frames. For this reason, the moving object can be accurately and quickly detected by very simple processing for verifying whether features corresponding to the prediction region on the line are present.

The moving object in the image can be efficiently detected as information of features which cannot be correlated while background features correlated to the estimation line are sequentially excluded from the image frames sequentially obtained by the mobile imaging system. For example, this technique is very effective to realize a mobile robot or the like.

The present invention is not limited to the particular embodiment described above. For example, when the imaging system is subjected to only a translational motion, rotation of the coordinate system need not be taken into consideration. Therefore, the prediction parameters can be much simplified, and the operations required for calculating a prediction line are further simplified. When generation of prediction lines for a plurality of features obtained from an image frame are concurrently performed, a processing speed can be increased. Other changes and modifications may be made without departing from the spirit and scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A moving object detecting system comprising:
    image acquiring means, having an imaging system, for acquiring image frames sequentially obtained by said imaging system;
    feature extracting means for extracting features of each image frame acquired by said image acquiring means;
    background feature detecting means for detecting background features belonging to a background region of the image frame from the features extracted by said feature extracting means;
    prediction parameter calculating means for obtaining prediction parameters for predicting a motion of the background region in the image frame upon movement of said imaging system in accordance with a positional relationship between the correlated background features between a plurality of image frames on the basis of the background features detected by said background feature detecting means;
    region estimating means for estimating a region of a given feature corresponding to the feature of an image frame of an immediately preceding frame by using the prediction parameters obtained by said prediction parameter calculating means when the given feature detected from the image frame obtained by said imaging system is assumed as a feature belonging to a background; and
    moving object determining means for determining whether a feature corresponding to the given feature is present in the estimation region obtained by said region estimating means.

2. A system according to claim 1, wherein said imaging system includes a television camera.

3. A system according to claim 1, wherein said imaging system is mounted on a moving unit.

4. A system according to claim 3, wherein said image acquiring means comprises means for acquiring image frames sequentially obtained with movement of said imaging system.

5. A system according to claim 1, wherein said feature extracting means includes means for calculating spatial differential values of image information in a plurality of directions and extracting portions having larger spatial differential values than a predetermined value as features.

6. A system according to claim 1, wherein said background feature detecting means includes means for detecting the background features belonging to a background region from the features of the plurality of image frames.

7. A system according to claim 1, wherein said background feature detecting means includes means for displaying an image, means for designating the background region in the image displayed by said image displaying means in accordance with an operator's operation, and means for detecting the features belonging to the background region designated by said designating means as the background features.

8. A system according to claim 1, wherein said prediction parameter calculating means includes means for calculating the prediction parameter on the basis of a plurality of image frames at the start of movement of said imaging system.

9. A system according to claim 1, wherein said prediction parameter calculating means includes means for determining whether features are correlated to each other on the basis of a similarity between image patterns near the given feature.

10. A system according to claim 1, wherein said prediction parameter calculating means includes means for displaying an image, means for designating correlated features in a plurality of image frames displayed by said image displaying means, and means for detecting the features of the plurality of image frames designated by said designating means as the correlated features.

11. A system according to claim 1, wherein said region estimating means includes means for estimating the region as a line region.

12. A system according to claim 1, wherein said moving object determining means includes means for determining that features for which correlated features are not present in the region are defined as new features.

13. A system according to claim 12, wherein said moving object determining means includes means for determining whether features belong to the moving object on the basis of the correlation of the new features between a plurality of image frames.

14. A method of detecting a moving object, comprising:
    the image acquiring step of causing an imaging system to sequentially obtain image frames and acquiring the image frames;
    the feature extracting step of extracting features of each acquired image frame;
    the background feature detecting step of detecting background features belonging to a background region of the image frame from the extracted features;
    the prediction parameter calculating step of obtaining prediction parameters for predicting a motion of the background region in the image frame upon movement of said imaging system in accordance with a positional relationship between the correlated background features between a plurality of image frames on the basis of the background features;
    the region estimating step of estimating a region of a given feature corresponding to the feature of an image frame of an immediately preceding frame by using the prediction parameters when the given feature detected from the image frame obtained by said imaging system is assumed as a feature belonging to a background; and
    the moving object determining step of determining whether a feature corresponding to the given feature is present in the estimation region.

* * * * *

UNITED STATES PATENT AND TRADEMARK OFFICE
CERTIFICATE OF CORRECTION

PATENT NO. : 5,103,305

DATED : April 7, 1992

INVENTOR(S) : Mutsumi Watanabe

It is certified that error appears in the above-identified patent and that said Letters Patent is hereby corrected as shown below:

Title page, item (54):

The title is incorrect, should be, --MOVING OBJECT DETECTING METHOD AND APPARATUS FOR A MOBILE IMAGING SYSTEM--.

Signed and Sealed this

Fifteenth Day of June, 1993

Attest:

MICHAEL K. KIRK

*Attesting Officer*  *Acting Commissioner of Patents and Trademarks*